(12) United States Patent
Fornell et al.

(10) Patent No.: US 11,877,672 B2
(45) Date of Patent: Jan. 23, 2024

(54) ACCESSORY ATTACHMENT DEVICE

(71) Applicant: HB Innovations, Inc., Los Angeles, CA (US)

(72) Inventors: Peter Fornell, Los Angeles, CA (US); Joseph J. Kopp, Jr., Cape Coral, FL (US); Adi Orucevic, Pasadena, CA (US); Coleman Baker, Los Angeles, CA (US)

(73) Assignee: HB Innovations, Inc., Los Angeles, CA (US)

( * ) Notice: Subject to any disclaimer, the term of this patent is extended or adjusted under 35 U.S.C. 154(b) by 314 days.

(21) Appl. No.: 16/808,864

(22) Filed: Mar. 4, 2020

(65) Prior Publication Data

US 2021/0275935 A1 Sep. 9, 2021

(51) Int. Cl.
*A47D 15/00* (2006.01)
*A47D 9/00* (2006.01)
(Continued)

(52) U.S. Cl.
CPC ............. *A47D 9/00* (2013.01); *A47D 15/00* (2013.01); *A63H 33/006* (2013.01);
(Continued)

(58) Field of Classification Search
CPC .... A63H 33/006; F16M 13/022; F16M 13/00; F16M 13/02; F16M 2200/06; A47D 15/00; A47D 9/00
(Continued)

(56) References Cited

U.S. PATENT DOCUMENTS 413,119 A * 10/1889 Weyant ................ A47C 29/006
248/219.4
442,629 A * 12/1890 Lipscomb ............ A63H 33/006
248/231.85
(Continued)

FOREIGN PATENT DOCUMENTS

CN  2741448  11/2005
CN  201533702 U  *  7/2010
(Continued)

OTHER PUBLICATIONS

International Search Report and Written Opinion of the International Searching Authority, PCT/US2021/020415, dated May 20, 2021.
(Continued)

*Primary Examiner* — Kimberly T Wood
(74) *Attorney, Agent, or Firm* — Akerman LLP (57) ABSTRACT

An attachment device is provided which allows a range of accessories to be mounted above a bassinet. The attachment device includes two clamps which are biased by a spring to be pulled toward one another, a vertical pole, and an arm which may be curved such that it attaches to the vertical pole at one end and may be substantially horizontal at the other end. The end of the arm furthest from the pole includes an attachment point for attaching accessories. An adapter may be used to connect the accessories to the attachment point. Specific safety measures may also be provided to prevent the attachment device from falling forward into the bassinet and to allow the attachment device to be removed quickly if necessary.

21 Claims, 8 Drawing Sheets

(51) Int. Cl.
*A63H 33/00* (2006.01)
*F16M 13/02* (2006.01)
*F16M 13/00* (2006.01)

(52) U.S. Cl.
CPC ........... *F16M 13/022* (2013.01); *F16M 13/00* (2013.01); *F16M 13/02* (2013.01); *F16M 2200/00* (2013.01)

(58) Field of Classification Search
USPC ..... 248/228.3, 228.4, 231.2, 231.41, 229.14, 248/228.5, 131.21, 231.85, 230.5; 5/94
See application file for complete search history.

(56) References Cited

U.S. PATENT DOCUMENTS

| | | | | |
|---|---|---|---|---|
| 462,319 A * | 11/1891 | Loehner et al. | ....... | F16M 13/02 248/231.41 |
| 810,900 A * | 1/1906 | Bartlett | ................ | A63H 33/006 248/629 |
| 1,295,483 A * | 2/1919 | Haas | .................... | A61G 7/0507 5/430 |
| 1,568,930 A * | 1/1926 | Hanschen | ................ | F21S 8/00 248/226.11 |
| 1,625,673 A * | 4/1927 | Nelson | ................. | A47C 29/006 135/90 |
| 1,906,369 A * | 5/1933 | Christie | .............. | A61M 5/1417 248/227.4 |
| 2,290,645 A * | 7/1942 | Lange | .................... | B60R 13/00 248/539 |
| 2,653,330 A * | 9/1953 | Nolan | ...................... | A47D 9/00 5/94 |
| 2,784,423 A * | 3/1957 | Droeger | ............... | A61G 7/0503 5/503.1 |
| 3,014,307 A * | 12/1961 | Dupuis | ................ | A63H 33/006 446/227 |
| 3,290,817 A * | 12/1966 | Kravath | ............... | A63H 33/006 446/227 |
| 4,939,582 A | 7/1990 | Holdredge | | |
| D479,654 S * | 9/2003 | Henick | .......................... | D6/301 |
| 7,523,528 B2 | 4/2009 | Carnevali | | |
| 7,740,216 B1 * | 6/2010 | Puckett | .................. | A47G 7/045 248/230.5 |
| 7,886,693 B1 * | 2/2011 | Salzman | .............. | A01K 1/0353 248/231.71 |
| 8,424,820 B2 | 4/2013 | Cotirla | | |
| 9,022,334 B1 * | 5/2015 | DeMayo | .............. | A61G 13/101 248/229.24 |
| 2010/0037440 A1 | 2/2010 | May | | |
| 2012/0049023 A1 * | 3/2012 | Reese | .................. | A63H 33/006 248/221.11 |

FOREIGN PATENT DOCUMENTS

| | | | | |
|---|---|---|---|---|
| CN | 205083096 | | 3/2016 | |
| DE | 29615391 U1 * | 12/1996 | ........... | A47C 29/006 |
| DE | 202009007274 U1 * | 8/2009 | .............. | A45B 1/00 |
| DE | 202019002222 U1 * | 6/2019 | .......... | A63H 33/006 |
| GB | 100958 A * | 7/1917 | .......... | A47C 29/006 |
| WO | WO-0065963 A1 * | 11/2000 | .......... | A47C 29/006 |
| WO | WO-2010003775 A1 * | 1/2010 | .......... | A47C 29/006 |
| WO | 2016035062 | | 3/2016 | |

OTHER PUBLICATIONS

Kids Baby Toys Mobile White Rattles Bracket Set Children Crib Clamp Bed Bell Toy Holder Fold Arm Bracket Wind-up Music Box, www.aliexpress/item/32921134191, printed May 18, 2020.

J.L. Childress Crib Mobile Attachment Clamp 18 inch, Easy Attachment with Rubber Padding, Fits Traditional and Convertible Cribs, www.amazon.com/J-L-Childress-Attachment-Traditional-Convertible/dp/B002TLSSIE, printed May 18, 2020.

* cited by examiner

ACCESSORY ATTACHMENT DEVICE

TECHNOLOGY

The present application relates to attachment devices, and more specifically to attachment devices that allow an accessory to be attached to a bassinet or similar sleeping container for a child. An attachment device is described which allows for a mobile, net, or any other item to be hung above a bassinet or sleeping container.

BACKGROUND

During the early part of an infant's life, parents or other caregivers may use a bassinet or crib as a primary sleeping surface for their infant. Bassinets are typically relatively small, portable structures that may have a variety of types of walls or rails surrounding the sleeping surface to prevent the infant from falling out.

In addition to the sleeping portion of a crib or bassinet structure, parents or caregivers may wish to attach accessories to walls, rails, or other surrounding structures. Example accessories can include mobiles, screens, or cameras. These accessories typically attach between two vertical posts or to an upper rail.

SUMMARY

In various embodiments, the present disclosure relates to an accessory attachment device that may be used with bassinets, including bassinets with flexible upper rails or structures. Additionally, some embodiments may relate to an accessory attachment device configured to fall outside of the bassinet if it becomes disengaged, for example unintendedly disengaged.

In one aspect, an accessory attachment device may include a vertical portion, and a clamp assembly that utilizes a bias member to pull two clamps together. The bias causes the clamps to exert forces on upper and lower structures of a bassinet such that the accessory attachment device may be securely affixed to the bassinet, including a bassinet with flexible rails. The upper and lower structures may be separated and may include upper and lower rails, lower edges, and/or underside structures of a bassinet. The vertical portion, such as a stanchion, may extend generally vertically from the clamp assembly for supporting an accessory. In some embodiments, the accessory attachment device also includes an arm portion that extends or is extendable from the vertical portion and may be curved to be positioned over a bassinet in use. In one example, the arm portion is modular and may be coupled to the vertical portion. The clamps may also be provided with offset feet which encourage the attachment device to fall away from the bassinet if the attachment device is accidentally disengaged. In another or a further example, the lower clamp comprises a body that extends outward or distally from the clamp assembly and the lower clamp foot extends upward from the body to define a gap therebetween. A lower edge of a bassinet may be positioned within the gap when the accessory attachment device attaches to a bassinet. In a further embodiment, the lower clamp foot engages an underside of the bassinet when the lower edge is positioned within the gap. In one embodiment, the accessory attachment device may include one or more secondary attachments to further secure the accessory attachment device to a bassinet and/or to prevent the accessory attachment device from falling into a sleep area of the bassinet if a clamp becomes disengaged. For example, the accessory attachment device may include a hook and loop fixture to also attach the accessory attachment device to the bassinet. In one example, the hook and loop fixture comprises a strap including a hook and/or loop portion for attaching to a complementary hook and/or loop structure on a bassinet. In a further example, the strap may extend from the bottom clamp and be configured to attach to a complementary hook and/or loop structure located along an underside or other structure of the bassinet to further encourage the attachment device to fall away from the bassinet if disengaged. The attachment device may also be configured to be swiftly and safely disengaged from the bassinet by grasping the arm or vertical portion and pulling the entire attachment device away from the bassinet.

In another aspect, an accessory attachment device is provided which may include a stanchion oriented in a generally vertical direction and having an upper and lower portion, an arm having a first and second end, and a clamp assembly. The arm may be configured such that the first end of the arm may interface with the stanchion in a substantially vertical direction while the second end of the arm extends horizontally from the first end of the arm. The clamp assembly may include an upper clamp, lower clamp, a connector connecting the upper clamp and lower clamp, and bias member, where the bias member may be biased to pull the upper clamp and lower clamp toward one another. The second end of the arm portion may include an attachment point for attaching an accessory to the arm portion. The upper clamp may include a foot projecting downwardly from a distal portion of the upper clamp and the lower clamp may include a foot projecting upwardly from a distal portion of the lower clamp. The foot of the lower clamp may be offset more distally than the foot of the upper clamp. In some embodiments, one or both of the upper clamp or lower clamp include multiple feet. In one embodiment, the accessory attachment device may include a secondary securing structure to provide additional securing of the accessory attachment device to a bassinet. For example, a strap or plug may be provided that may be configured to attach to the bassinet. In a further example, a strap may extend from the accessory attachment device for attachment to the bassinet. In still a further example, the strap extends from the lower clamp. The strap may include various attachment structures such as clips, hooks, snaps, rail and groove, press-fit, tabs, and/or hook and loop structures configured to attach to corresponding and/or complementary structures of the bassinet. Various accessories may be used with the accessory attachment device such as, but are not limited to, a mosquito net, mobile, or camera. In some embodiments, the stanchion may include an interior space for wiring to be routed, e.g., for use with attachments requiring power and/or data, so as to hide such wiring to the end user.

In yet another aspect, a method for attaching an accessory to a bassinet may include providing an accessory attachment device having a stanchion and a clamp assembly. An arm portion may extend from a vertically extending portion of the stanchion. A method of for attaching the accessory attachment device may include pulling upper and lower clamps apart such that the clamps are farther apart than upper and lower structures, such as a lower edge and upper rail of the bassinet, and placing the upper clamp above the upper structure and the lower clamp below the lower structure such that the upper and lower clamps, when released, are pulled back together to entrap the upper structure and lower structure of the bassinet. In one example, the lower clamp may position around a lower edge and engage an underside of the bassinet with one or more feet. The stanchion or arm portion may be configured to include a horizontally extending portion that extends in a horizontal direction relative to the clamp assembly. In one embodiment, the clamp assembly may include a body and an upper and lower clamp and the clamp assembly may be biased to pull the upper and lower clamps together. The method may also include attaching an accessory to the stanchion or arm portion such that the accessory positions above and/or hangs over the bassinet. The method may also include providing one or more feet on the upper and lower clamps. The feet may be oriented to extend upwardly from the lower clamp and downwardly from the upper clamp. The method may include positioning the clamps such that the feet entrap upper and lower structures of the bassinet between the feet. The method may also include providing secondary attachment for providing an additional attachment with the bassinet. For example, a strap may extend from the accessory attachment device and be attachable to the bassinet. In one embodiment, the strap includes a hook and/or loop portion and the method of attaching the accessory attachment device includes engaging the hook and/or loop portion to a complementary hook and/or loop structure positioned on an underside of the bassinet.

An accessory attachment device may include a clamp assembly, a generally vertically oriented body, and a generally horizontally oriented arm. The horizontally oriented arm may have a first and second end. The clamp assembly may include an upper portion, a lower portion, and a compressing mechanism, wherein the upper portion and lower portion are compressed toward one another by the compressing mechanism. The clamp assembly may be attached to one end of the generally vertically oriented body and the first end of the generally horizontally oriented arm may be attached to a second end of the generally vertically oriented body. The accessory attachment device may further include an upper foot on the upper portion of the clamp assembly and a lower foot on the lower portion of the clamp assembly, such that the upper foot may be provided on the distal portion of the upper portion of the clamp assembly and extend in a generally downward direction. The lower foot may be provided on the distal portion of the lower clamp assembly and extend in a generally upward direction. The lower foot may be positioned further from the compressing mechanism in the distal direction than the upper foot. The accessory attachment device may also include a secondary attachment on the lower portion of the clamp assembly such that the secondary attachment may be configured to attach the lower portion of the clamp assembly to an underside of the bassinet. The second end of the generally horizontally oriented arm may include an attachment point configured to accept an accessory. The accessories that may be used with the attachment include, but are not limited to, a mosquito net, mobile, or camera.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DESCRIPTION

Current accessory attachment devices for rigid rail bassinets are designed in an unsafe manner, e.g., in a way that encourages the attachment device to fall into the bassinet and potentially injure an infant. This safety hazard is magnified if used with bassinets to attach along a flexible rail. For example, the flex in the rail can cause the attachment device to disengage, allowing the attachment device and/or an associated accessory to fall inside the sleep area, potentially injuring the child during the fall and/or creating a suffocation hazard. The attachment device may be configured such that forward disengagement of the device is prevented, whilst allowing simple and controlled disengagement in all other directions. For example, the attachment device may be simply and controllably disengaged by a user in a rearward, vertical, or lateral directions. Various embodiments, the accessory attachment described herein may be configured to avoid such hazards when attached along rigid or flexible rails or other structures.

The present disclosure describes various embodiments of an accessory attachment device. While the accessory attachment device is referred to herein for use with a bassinet, bassinet is intended to include cribs, cradles, bassinets, and other infant and/or young child bed structures and sleeping containers having rails or other structures positioned around the sleep area to which the accessory attachment device may utilize for attachment. One exemplary type of bassinet is the SNOO, manufactured by Happiest Baby, Inc, Los Angeles, Calif., which includes breathable walls and flexible upper rails to protect the infant. Parents or caregivers may wish to attach accessories to the surrounding structures, e.g., walls or rails. The accessories may be used to protect or monitor the infant, improve sleep quality, and/or provide auditory or visual stimulation for the infant, for example. In one example, a parent or caregiver may wish to provide a mosquito net to protect the infant while sleeping or to monitor the infant with a camera. In another example, the parent or caregiver may wish to include a mobile above the bassinet to help the infant fall asleep and/or stimulate an infant in the bassinet when the infant is awake. A net, camera or mobile accessory may extend from, or attach to, an attachment point along the accessory attachment device. In one example, an accessory may attach to an adaptor that attaches to the attachment point. Many other accessories may be used with the accessory attachment device, including accessories that require an attachment point over the bassinet.

FIGS. 1A-7 illustrate various embodiments of an accessory attachment device related components and uses thereof where like numbers are used to identify like features. With specific reference to FIGS. 1A & 1B, an accessory attachment device 2 may include a clamp assembly 4 and stanchion 10 for attachment with an accessory. The stanchion 10 may include a generally vertically extending portion 11. In some embodiments, the stanchion 10 also includes or couples to an arm portion 6 that extends outwardly from the vertically extending portion 11. Thus, while arm portion 6 may be described herein as a separate structure for ease of understanding, it is to be appreciated that the stanchion 10 may include the arm portion 6 features described herein. Further, the stanchion 10 and/or arm portion 6 may have various lengths, dimensions, profiles (e.g., curve, bend, and/or branch profiles), and/or attachment point designs. A stanchion 10 comprising one or more modular vertical extensions and/or arm portions 6 may allow replacement and/or interchangeability of extensions or arm portions 6 to provide multiple configurations from which an accessory may be positioned. In various embodiments, the accessory attachment device 2 includes a stanchion 10 and two or more arm portions 6 having different configurations. In one example, each configuration may be interchangeably used with two or more accessories. In a further or another example, each configuration may be unique for a particular accessory. In an example, multiple arm portions may be used together to increase a length, provide a different profile, etc. to suit a desired use.

Figure 1A:
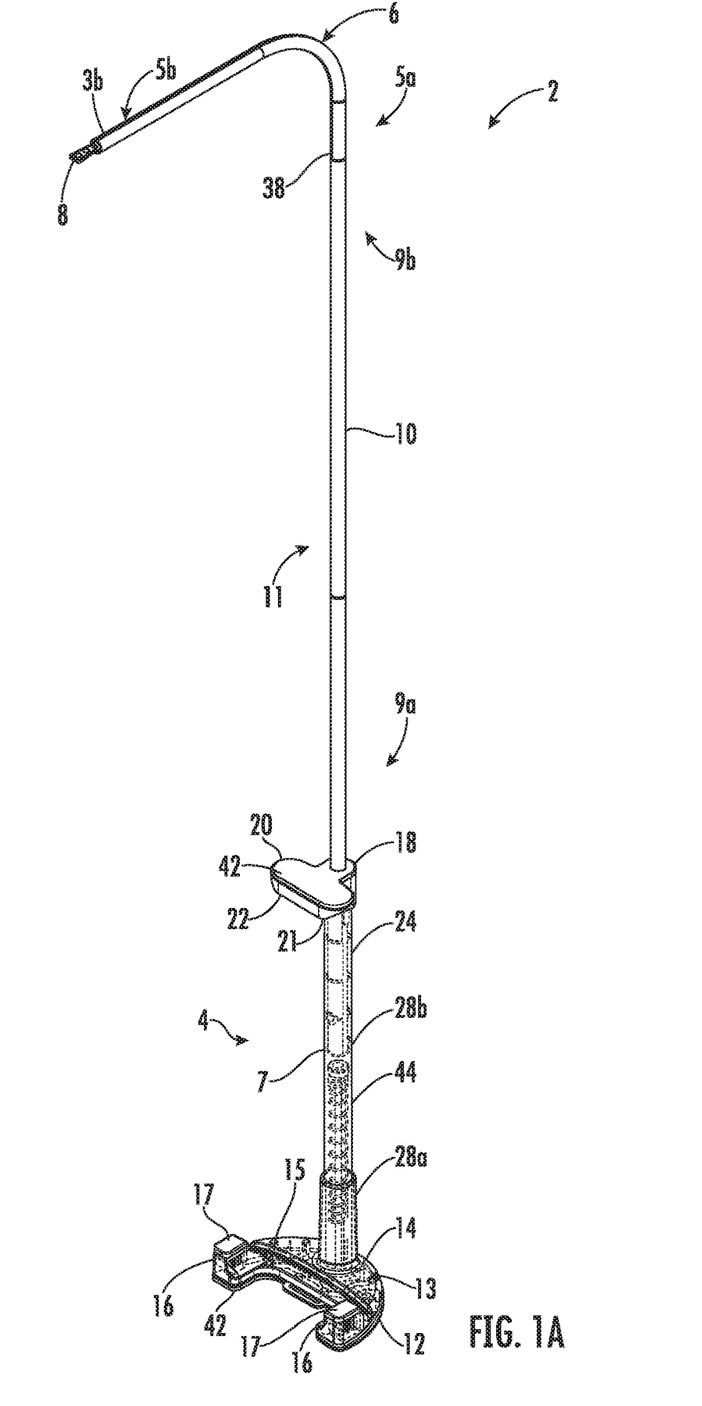
FIG. 1A is a perspective view of an embodiment of an attachment device according to various embodiments described herein.
Figure 1B:
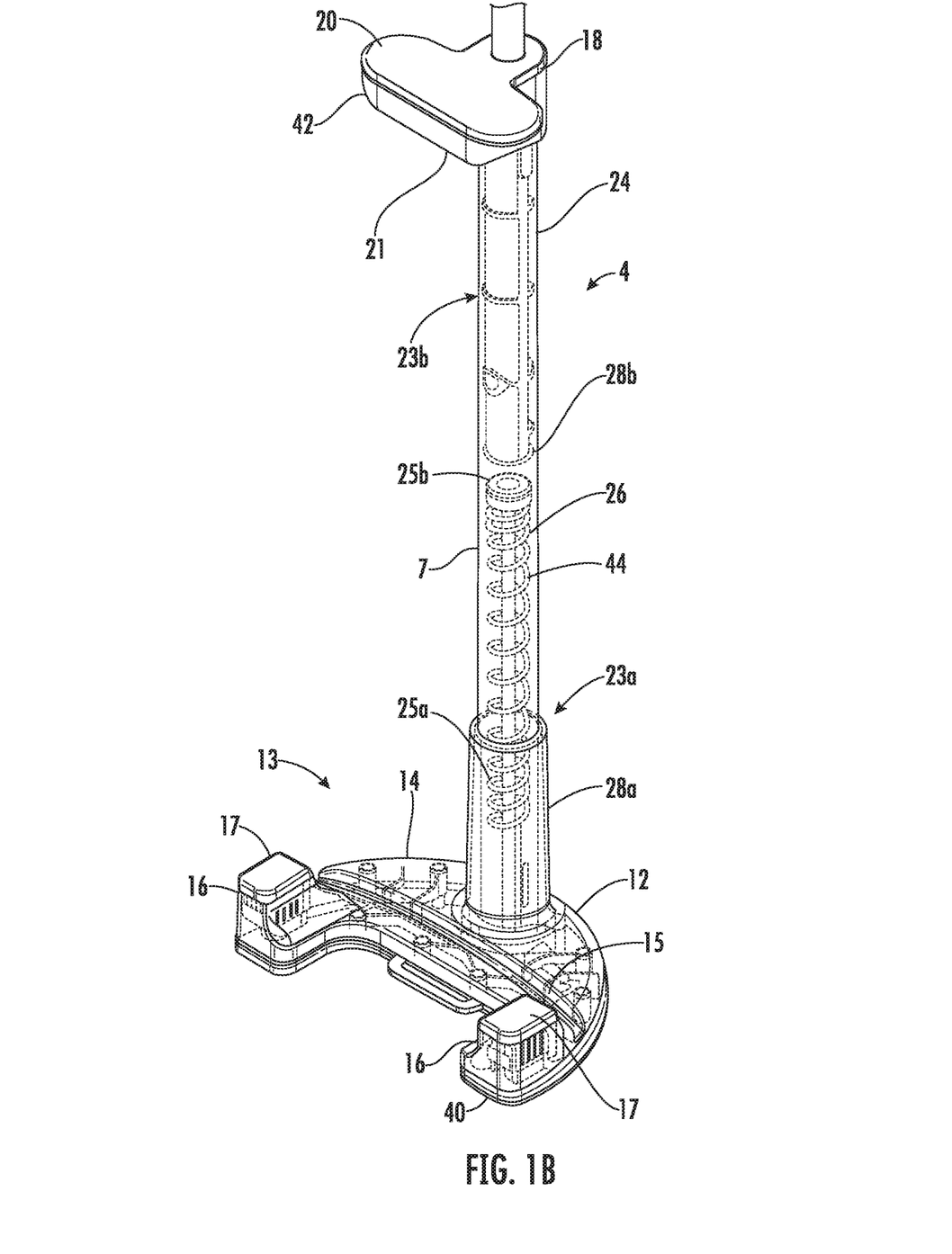
FIG. 1B is a magnified view of the clamp assembly of the attachment device illustrated in FIG. 1A.

The stanchion 10, or the vertically extending portion 11 thereof, may include a first end 9a that extends from the clamp assembly 4 and a second end 9b that extends to the arm portion 6. The second end 9b of the stanchion 10 interfaces with a first end 5a of the arm portion 6. The arm portion 6 may extend from the first end 5a to a second end 5b. An attachment point 8 may be positioned along the second end 5b and may be configured to receive an accessory, for example netting, a camera, or a mobile. In some embodiments, the stanchion 10 and/or arm portion 6 may be constructed from sturdy and/or lightweight materials. For example, the stanchion 10 and/or arm portion 6 may comprise a lightweight metal, such as aluminum, a composite material, or any other durable, lightweight material. The arm portion 6 may be modular with respect to the stanchion 10 or may be integral therewith. In one embodiment, the attachment device 2 does not include an arm portion 6, but rather the attachment point 8 for attaching to an accessory is positioned along the second end 9b. In a further embodiment, the attachment device 2 includes an integrated accessory that extends from the stanchion 10 or arm portion 6. In the illustrated embodiment, the stanchion 10 and arm portion 6 include a series of threaded sleeve sections that may be removed, replaced, or interchanged to modify a length and/or structure of the stanchion 10 and/or arm portion 6. However, in some embodiments, the stanchion and/or arm portion 6 may include additional, fewer, or only a single section. In various embodiments, the arm portion 6 may be curved so that the first end 5a may attach to the vertically extending portion 11 of the stanchion 10 while the second end 5b may be in a generally or substantially horizontal orientation, which may be configured to extend at least partially above a bassinet 50. The curve of arm portion 6 may also provide a convenient grasping point to quickly remove attachment device 2 if necessary. The attachment point 8 may be preferably located on the distal portion of the second end 5b of arm portion 6. The arm portion 6 may be preferably attached to the stanchion 10 at a proximal portion 38 of the first end 5a of arm portion 6. The stanchion 10 is preferably constructed from a rigid material such as metal or a composite. In some embodiments, the stanchion 10 may comprise a tube having a round, triangular, rectangular, square, or other geometric or non-geometric cross-section. In a further or another example, the stanchion 10 may comprise a solid or hollow interior bore. In a further example, the stanchion 10 may be hollow to provide space for wiring or additional mechanisms.

Clamp assembly 4 may include a lower clamp 12, upper clamp 18, and a connector 7 connecting the lower clamp 12 and upper clamp. The connector 7 may include a housing 24. The clamp assembly 4 is configured to bias the lower and upper clamps 12, 18 toward each other to clamp to lower and upper structures of a bassinet.

The lower clamp 12 may include a lower clamp body 14 and one or more lower clamp feet 16. The lower clamp body 14 is preferably constructed of a sturdy material, including metals, composites, and polymers. The lower clamp 12 may be attached to a lower end of the connector 7. In the illustrated embodiment, the lower clamp 12 is connected to the connector 7 along a lower portion of housing 24. The lower clamp body 14 may extend outwardly from the lower portion of housing 24 to position the lower clamp feet 16 outwardly of the connector 7 and housing 24 thereof. The lower clamp feet 16 may extend from a distal portion 40 of the lower clamp body 14. The lower clamp feet 16 may further extend upwardly from the lower clamp body 14 and be configured to engage a bassinet in use. The lower clamp feet 16 may include engagement surfaces 17 for engaging a bassinet. The lower clamp feet 16 and/or engagement surfaces 17 preferably comprise a compressible and/or elastomeric material such as silicone. In various embodiments, engagement surfaces 17 may be contoured to correspond with contours of an intended attachment point on a bassinet to which it is to attach. For example, the lower clamp feet 16 may include an arcuate contour to correspond with that of an arcuate contour of a lower rail, underside, or other lower bassinet structure. In one embodiment, the lower clamp feet 16 comprise a groove to engage a lower edge of a bassinet. In the illustrated embodiment, the lower clamp feet 16 include planar engagement surfaces 17 constructed from silicone. While two lower clamp feet 16 are illustrated, in some embodiments, additional lower clamp feet 16 may be included. In one embodiment, only a single lower clamp foot 16 extends from the lower clamp body 14.

The connector 7 and lower clamp feet 16 may be spaced apart to provide a horizontally extending gap 13 therebetween. For example, the lower clamp body 14 may extend outwardly or distally from the connector 7 or housing 24 and the lower clamp feet 16 may extend upward from an outward or distal portion 40 of the body 14. In use, the gap 13 may provide a location for a lower edge or structure, such as a lower rail, of a bassinet to position. In one example, the gap 13 is defined between the housing 24 and the lower clamp feet 16. In some embodiments, and as exemplified in the illustrated embodiment, the lower clamp body 14 further defines a groove 15 along its upper surface that further defines a base of the gap 17. The groove 15 comprises a width and depth suitable to receive a lower edge or structure of a bassinet when the accessory attachment 2 attaches to a bassinet. In the illustrated embodiment, the groove 15 extends along a slight arcuate path to correspond with a curvature of a lower edge or structure of a bassinet. In some embodiments, a groove 15 may extend along a straight path or path having other curvatures. In various embodiments, the groove 15 is dimensioned such that a lower edge or structure of the bassinet does not contact or substantially contact the upper surface of the lower clamp body 14 defining the groove 15 when received within the groove 15. In one example, the groove 15 is dimensioned to closely approximate the dimensions of a lower edge or structure of a bassinet such that interaction therebetween when received therein limits significant movement of the lower clamp 12 and the stanchion 10 and arm portion 6 from falling toward the sleep area of the bassinet. Typically, the engagement surfaces 17 are positioned to engage a lower or underside of a bassinet; however, in some embodiments, the upper surface of the lower clamp body 14 that forms a base of gap 13 may be configured to engage a lower edge or rail in addition to or instead of engagement surfaces 17. In one such embodiment, the upper surface of the lower clamp body 14 forming the base of gap 13 includes a compressible or elastomeric material configured to engage a lower edge or rail of a bassinet. In an example including a groove 15, the lower clamp body 14 may be configured to engage a lower edge or rail of a bassinet within the groove 15. In some embodiments, the lower clamp 12 does not include a gap 13 and/or groove 15.

The upper clamp 18 may include an upper clamp body 20 and upper clamp feet 22. The upper clamp 18 may be attached to an upper portion of the connector 7. In the illustrated embodiment, the upper clamp 18 is attached to the connector 7 along an upper portion of housing 24. The upper clamp 18 may be preferably constructed from a sturdy material, including metals, composites, and polymers. The upper clamp body 20 may include one or more upper clamp feet 22 which extend downwardly from the upper clamp body 20 to engage an upper structure of a bassinet, such as an upper rail 52. Preferably, the upper clamp body 20 comprises a compressible and/or elastomeric material such as silicone. An upper clamp foot 22 may extend from a distal portion 42 of the upper clamp body 20 and be configured to compress against an upper structure of a bassinet, such as an upper rail, when biased there against by the operation of the clamp assembly 4. Such compression shall be sufficient to hold the clamp assembly 4 under normal use but release if more than normal force is applied (such as a toddler or pet pulling on the attachment device 2 or attachment coupled thereto). This feature may be implemented to prevent the attachment device 2 from providing a location from which the position of a bassinet may be manipulated. That is, the clamp assembly 4 may be configured to disengage upon application of force sufficient to pull over the bassinet or sleep surface. The attachment device 2 may also be configured to fall away from the sleep surface when disengaged. The upper clamp foot 22 may include one or more engagement surfaces 21 for engaging a bassinet. The upper clamp foot 22 and/or engagement surfaces 21 may preferably comprise a compressible and/or elastomeric material such as silicone. Engagement surfaces 21 may be planar or contoured to correspond with contours of an intended attachment point on a bassinet to which it is to attach. For example, the upper clamp foot 22 may have an arcuate contour to match that of an upper rail or edge of a bassinet. In one embodiment, the upper clamp foot 22 comprises a groove to engage an upper edge of a bassinet. In the illustrated embodiment, the upper clamp foot 22 includes an arcuate engagement surface 21. In some embodiments, a distal portion 21a of the engagement surface 21 may extend along a reduced radius relative to a proximal portion 21b of the engagement surface 21. In this or another embodiment, the proximal portion 21a of the engagement surface 21 may extend vertically below the distal portion 21b of the engagement surface 21. While the illustrated upper clamp 18 includes a single upper clamp foot 22, in some embodiments the upper clamp 18 includes additional upper clamp feet 22. In the illustrated embodiment, the upper clamp feet 22 are also offset distally with respect to the lower clamp feet 16 such that the upper clamp feet 22 do not extend as far distally as the lower clamp feet 16. This arrangement may encourage the entire attachment device 2 to fall outside of the bassinet 50 in the event the attachment device 2 is accidentally detached, for example, during bassinet use. For example, when a lower edge or rail of a bassinet is positioned within the gap 13, the stanchion 10 and arm portion 6 are prevented from falling forward into a sleeping area of the bassinet.

The connector 7 may comprise a generally vertically extending expanse of material that connects the lower and upper clamps 12, 18. As introduced above, the connector 7 may include a housing 24 that houses a bias member 26 that biases the lower and upper clamps 12 toward each other. The housing 24 may include a hollow portion in which the bias member 26 is positioned or the bias member 26 may be positioned along an exterior side of the housing 24. The housing may include a first end 23a and a second end 23b. The first end 23a may extend to the lower clamp 12 and the second end 23b may extend to the upper clamp 18. The bias member 26 may bias the first and second ends 23a, 23b toward each other. For example, the first end 23a may be movable relative to the second end 23b and the bias member 26 may include a first end 25a that connects to the first end 23a of the housing 24 and a second end 25b that connects to the second end 23b of the housing 24. The housing 24 may preferably include a rigid and/or flexible material. For example, the first and second ends 23a, 23b and a flexible or stretchable material may be coupled therebetween to allow the first and second ends 23a, 23b to relatively move. In another example, the first and/or second ends 23a, 23b include a sleeve within which the other may slide to maintain alignment between the ends 23a, 23b during relative movement. In the illustrated embodiment, the housing 24 has a cylindrical shape with a lumen passing through the cylinder in the vertical direction. Alternatively, the housing 24 may comprise a pipe having any cross-sectional shape that includes a lumen. As introduced above, the housing 24 houses a biasing member 26, which in the illustrated embodiment comprises a spring. Other bias members may be used, such as elastic bands and/or other biasing structures and configurations. The housing 24 further includes fixing points 28a, 28b within the lumen. Fixing points 28a, 28b may be located along first and second ends 28a, 28b of housing 24 to thereby fix ends 25a, 25b of the bias member 26 relative to the ends 23a, 23b of the housing 24. Alternatively, fixing points 28a, 28b may be located on a rod 44 that passes through the lumen of housing 24. The bias member 26 may be selected such that it continually imparts a force that tends to pull the upper clamp 18 and lower clamp 12 toward one another, at least to a distance that is less than that of attachment points the clamp is configured to attach. This allows upper clamp 18 to continually exert a downward force on an upper structure, such as a upper rail, of a bassinet and lower clamp 12 to continually exert an upward force on a lower or underside structure of the bassinet such that the clamping force securely fixes the attachment device 2 to the bassinet. The force may also be configured to allow the attachment device 2 to be easily removed from the bassinet by countering the force to expand the clamp assemble 4.

Figure 2A:
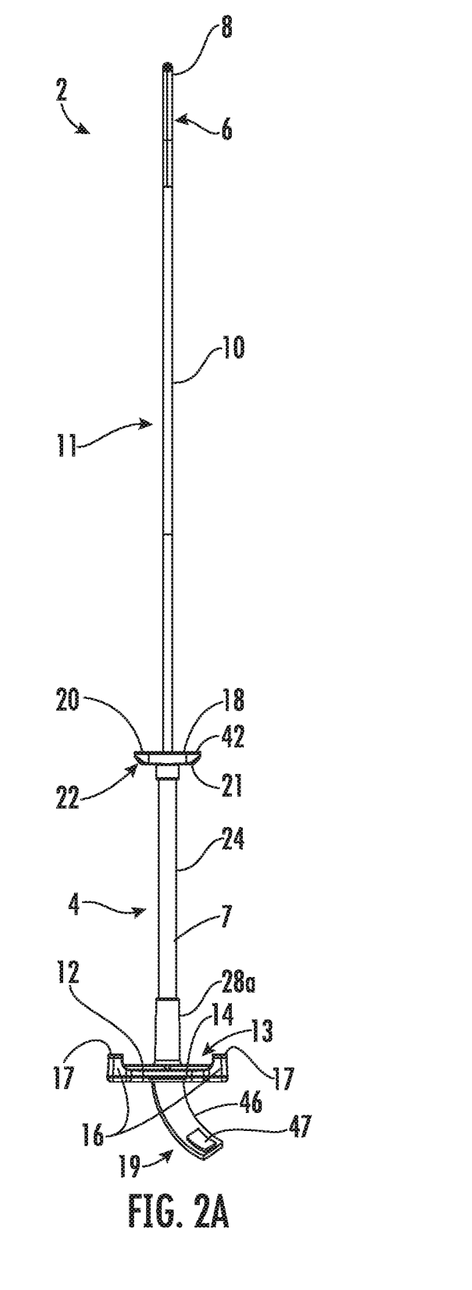
FIG. 2A is a front elevation view of an attachment device according to various embodiments described herein.
Figure 2B:
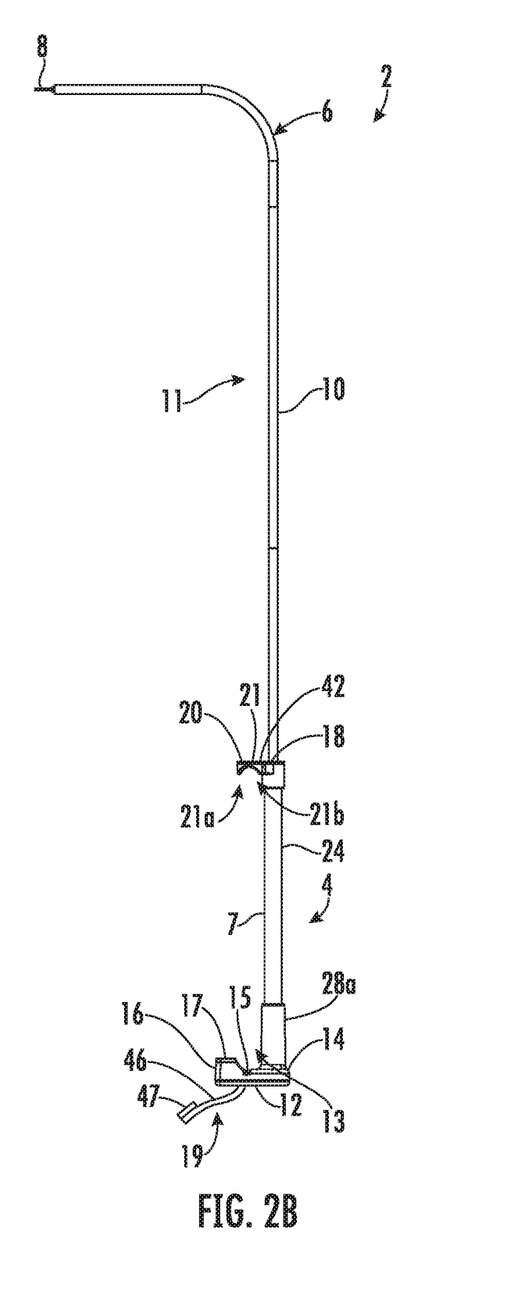
FIG. 2B is a side elevation view of the attachment device illustrated in FIG. 2A according to various embodiments described herein.

FIGS. 2A & 2B illustrate a further embodiment of the accessory attachment device 2 including a secondary attachment 19 for providing a secondary attachment to a bassinet. The accessory attachment device 2 may be otherwise as described above with respect to FIGS. 1A & 1B. In the illustrated embodiment, the secondary attachment device 19 includes a strap 46 that extends from the lower clamp 12. The strap 46 includes an attachment structure 47 comprising a hook or loop material configured to couple with a complementary hook or loop material positioned on a bassinet. The complementary hook or loop material may be located along an underside of the bassinet, for example, or elsewhere. In some embodiments, the strap 46 may additionally or alternatively include other attachment structures 47 such as snaps, clips, zippers, rail and groove, or magnets, for example, for coupling the strap to a corresponding attachment structure positioned on the bassinet. It will be appreciated that other secondary attachments 19 may be used. For example, the lower clamp 12, such as lower clamp body 14, lower clamp feet 16, base of the gap 13, and/or engagement surfaces 17 may include magnets, magnetized material, or magnetic attracted material configured to engage or proximate magnets, magnetized material, or magnetic material positioned on a bassinet to provide additional security. In one example, the accessory attachment device 2 includes a clip configured to clip to a bassinet.

Figure 3:
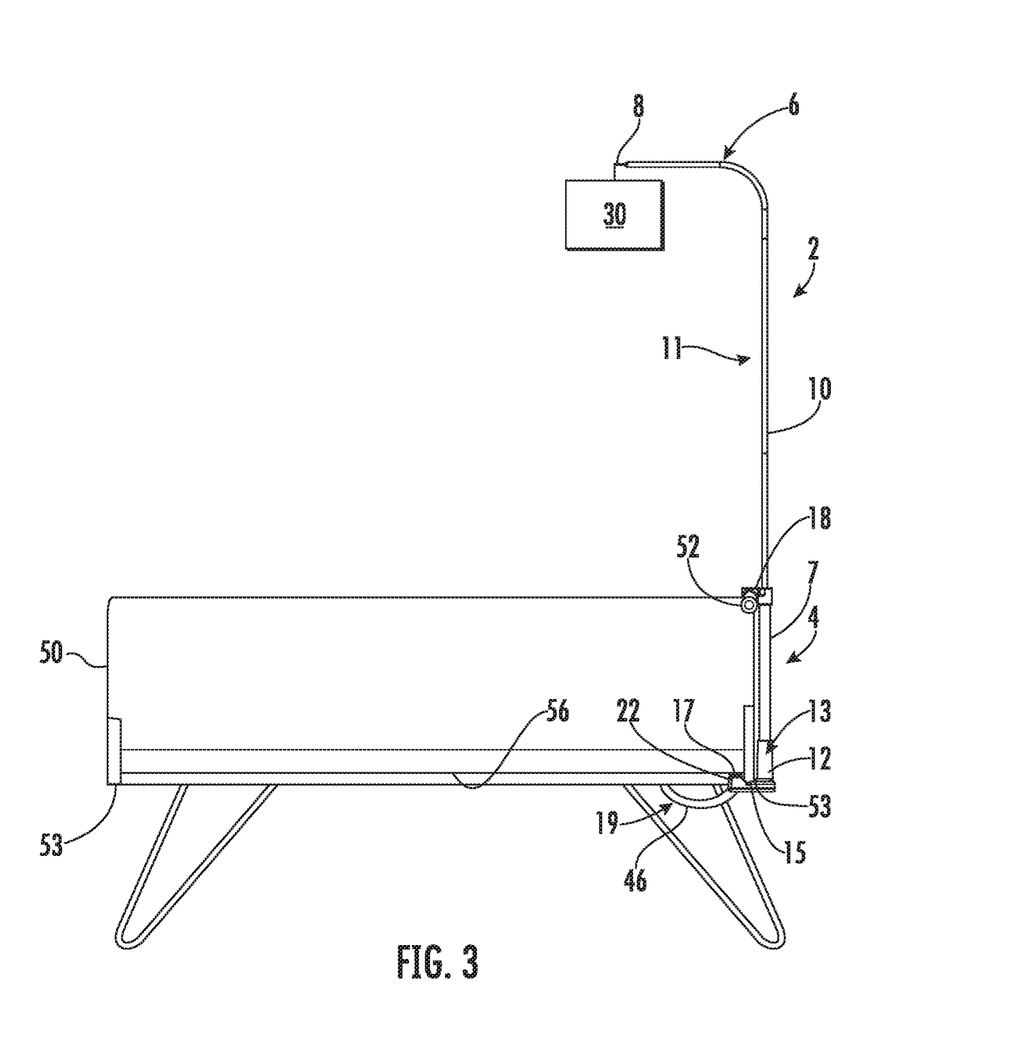
FIG. 3 is a side elevation view in cross-section of an attachment device installed on a bassinet according to various embodiments described herein.

FIG. 3 depicts the accessory attachment device 2 illustrated in FIGS. 2A & 2B attached to a bassinet 50. To install the attachment device 2, a user may hook the lower clamp 12 to the underside of the bassinet 50 or sleeping surface thereof and then extend the upper clamp 18 above an upper portion of the bassinet 50, such as the upper rail surface. The upper clamp 18 may then be released. The attachment assembly 4 will self-adjust to the position of the height and position of the bassinet 50 attachment points. For example, the user may need only hook the lower clamp 12 and pull the upper clamp 18 above the rail of the bassinet 50 and the clamp assembly 4 may then snap into place. In a further example, a user may position lower feet 16 around the lower edge 53 of the bassinet to hook and/or engage an underside 56 of the bassinet 50. With some bassinet 50 configurations the lower edge 53 may position in gap 13 and further extend into groove 15. The user may then position the attachment device 2 such that the upper clamp 18 is above the upper rail 52. The user may then release the upper clamp 18 to allow the engagement surface 21 to engage the upper rail 52 such that the attachment device grasps the upper rail 52 and the underside 56 of the bassinet 50 between the upper clamp 18 and lower clamp 12. The secondary attachment 19 may also be attached by extending the strap 46 along the underside 56 of the bassinet 50 to interface the hook or loop attachment structure 47 with the corresponding hook or loop material positioned along the underside 56 of the bassinet 50. Before, during, or after installing the accessory attachment 2, the user may attach an accessory 30 to the attachment point 8 on the arm portion 6. In various embodiments, adaptors that allow different accessories 30 to be attached to the attachment point 8, including but not limited to nets, mobiles, or cameras may be used. In some instances the attachment point 8 or adaptors coupled to the attachment point 8 may comprise universal attachment structures configured to interchangeably attach two or more accessories 30. It will be understood that any other, preferably lightweight, accessory may also be hung over bassinet 50 using attachment point 8. As noted above, in some embodiments, an accessory may be integrated with stanchion 10 and/or arm portion 6.

Figure 4A:
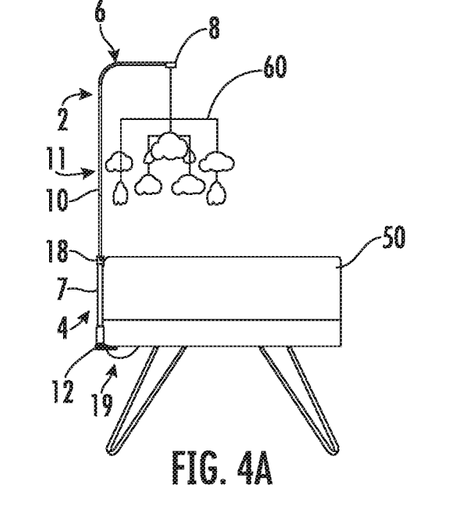
FIG. 4A is a side elevation view of an attachment device and an accessory mobile installed on a bassinet according to various embodiments described herein.
Figure 4B:
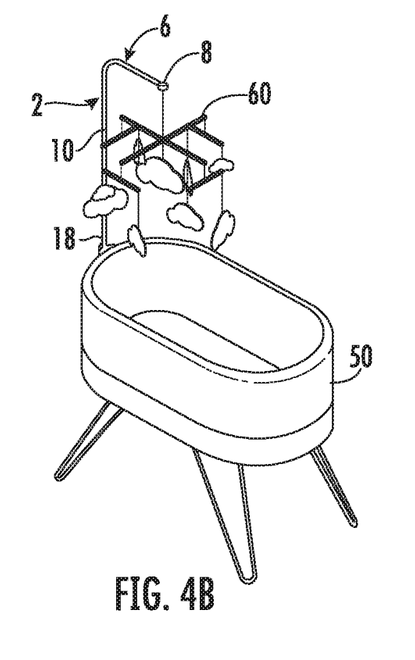
FIG. 4B is a perspective view of the attachment device and accessory mobile installed on the bassinet illustrated in FIG. 4A according to various embodiments described herein.
Figure 4C:
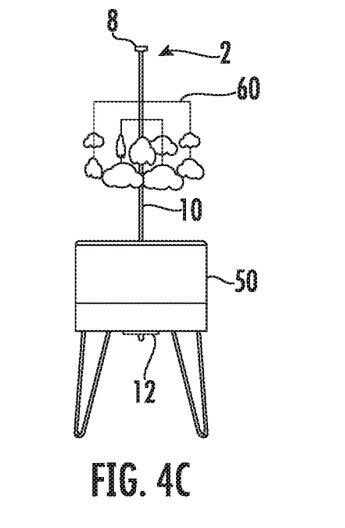
FIG. 4C is a front elevation view of the attachment device and accessory mobile installed on the bassinet illustrated in FIGS. 4A & 4B according to various embodiments described herein.

FIGS. 4A-4C illustrate an example of FIG. 3 wherein the accessory 30 comprises a mobile 60 attached to the accessory attachment 2. The mobile 60 may be attached or attachable to the attachment point 8 by any suitable method. For example, the mobile 60 may be attached via clamp, bracket, clips, or via mateable structures such as a press-fit, rail and groove, or threaded connections. In one example, the attachment point 8 or adapter attached to the attachment point may include a slot having an open end. A string extending from the mobile 60 may be knotted and inserted into the slot through the open end such that the knot positions on a first side of the slot and a mobile end of the string positions on a second side wherein the dimensions of the slot prevent the knot from being pulled through the slot. In a further embodiment, a cap may be placed over the attachment point 8 to prevent the string from being pulled from the open end of the slot.

Figure 5:
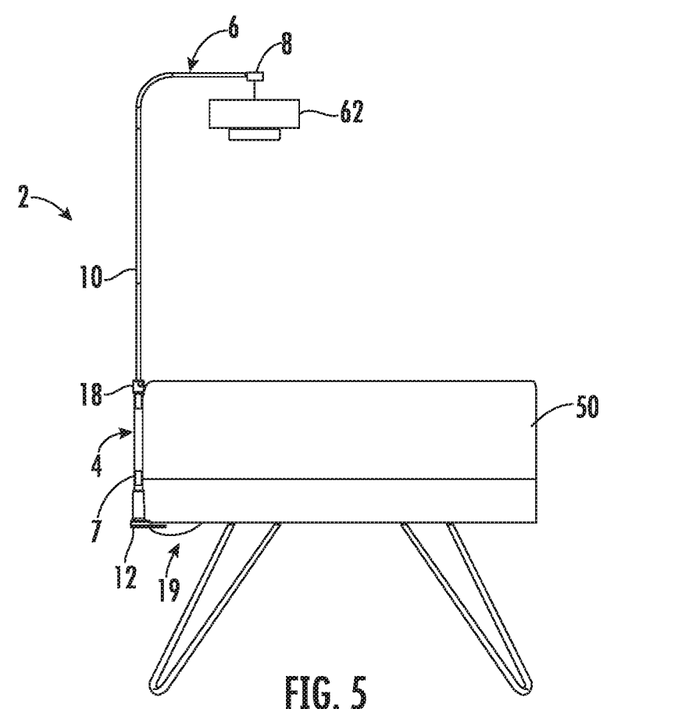
FIG. 5 is a side elevation view of an attachment device and an accessory camera installed on a bassinet according to various embodiments described herein.

FIG. 5 illustrates another example of FIG. 3 wherein the accessory 30 comprises a camera 62 attached to the accessory attachment 2. The camera 62 may be directed at the child or elsewhere. The camera 62 may be attached to the attachment point 8 by any suitable method. For example, the camera 62 may be attached via clamp, bracket, clips, or via mateable structures such as a press-fit, rail and groove, or threaded connections. The camera 62 may be wireless and/or wiring for the camera 62 may run through a lumen of stanchion 10 and/or arm portion 6 or be wrapped around the same.

Figure 6A:
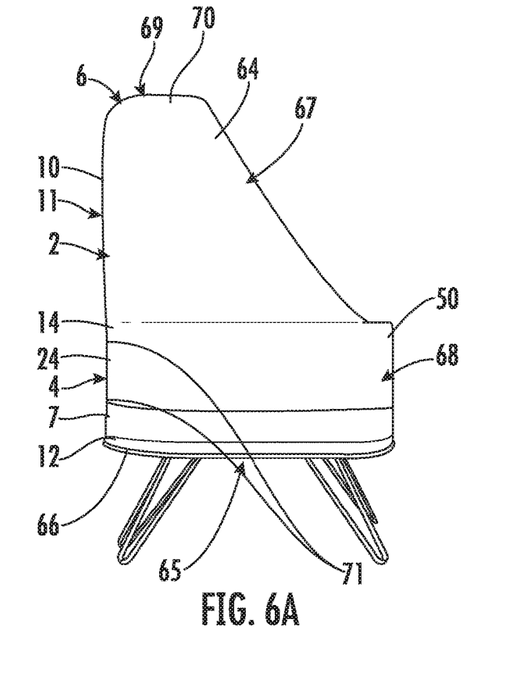
FIG. 6A is a side elevation view of an attachment device and accessory mosquito net installed on a bassinet according to various embodiments described herein.
Figure 6B:
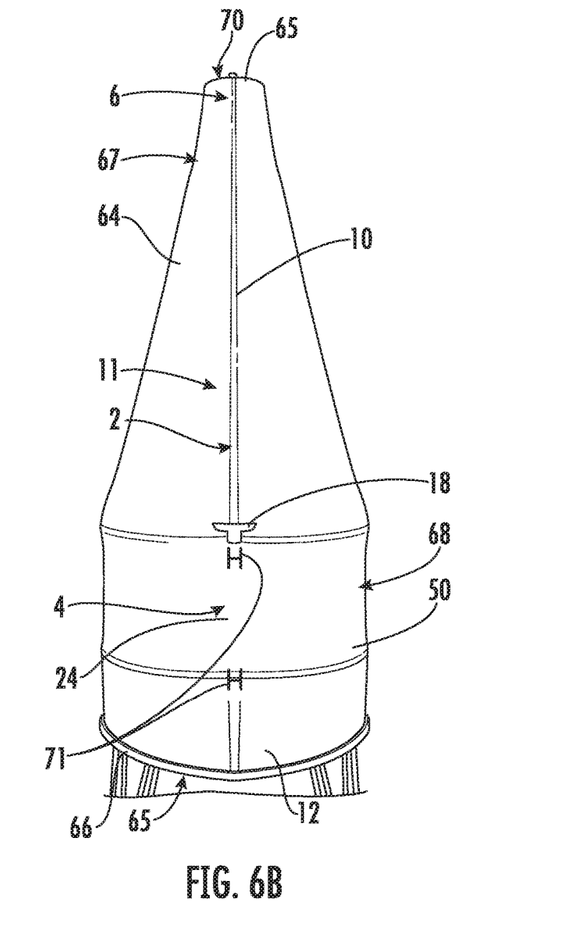
FIG. 6B is a rear elevation view of the attachment device and accessory mosquito net installed on the bassinet illustrated in FIG. 6A according to various embodiments described herein.

FIGS. 6A & 6B illustrate another example of FIG. 3 wherein the accessory 30 comprises a mosquito net 64 attached to or positioned on the accessory attachment 2 stanchion 10 and/or arm portion 6. For example, a user may attach a mosquito net 64 or component thereof to the attachment point and then drape the mosquito net 64 around the bassinet 50. The mosquito net 64 preferably fits snuggly around an exterior of the bassinet 50 and includes a weighted hem or edge 66 to help keep the mosquito net 64 in place and taut. In one example, a cord of a weight material may be lined within the hem of edge 66. In another example, sand, glass beads or other weighting material may be held within the hem of edge 66. In some embodiments, an interior perimeter of the mosquito net 64 increases toward the opening 65 along a first portion 67 and then maintains a substantially consistent perimeter along a second portion 68 corresponding to the portion of the net 64 that positioned around the sides of the bassinet 50. In a further embodiment, the perimeter of the first portion 67 when expanded defines a conical cross-section that increases along the first portion 67 toward the second portion 68. In a further or another embodiment, one side of the mosquito net 64 may extend substantially vertically from the opening 65 to a bottom 69 of the net 64 along a first side, corresponding to a side the interfaces with the accessory attachment 2, and extends from the base 69 along a second side, opposite the first side, along the first portion 67 to the second portion 68 at an angle less than 90 degrees, such as less than about 80 degrees, less than about 70 degrees, less than about 60 degrees, or less than about 50 degrees from the second side. In a further example, the second side may extend along the second portion 68 about parallel to the first side. One or more clips 71 may also be used to clip the mosquito net 64 to the stanchion 10, arm portion 6, and/or clamp assembly 4.

In the illustrated embodiment, the mosquito net 64 is draped over a positioning structure 70 configured to allow the mosquito net 64 to maintain interior volume above the bassinet 50 in use. The positioning structure 70 may comprise an expanse of material that maintains separation of sides of the mosquito net 64 when positioned therein. The expanse of material is preferably positioned along the bottom 69 when in use, but other locations within the mosquito net 64 may be used. In some embodiments, the mosquito net 64 may be attached to the attachment point or an adaptor attached along the attachment point. In various embodiments, the positioning structure 70 may extend about parallel to the hem or edge 66 of the net 64, upper rail, and/or lower edge of the bassinet. In other embodiments, the positioning structure 70 may extend at non-parallel angles to that of the hem, upper rail, and/or lower edge of the bassinet to compensate for the weight of the net 64 asserting a downward pull on 70.

Figure 7:
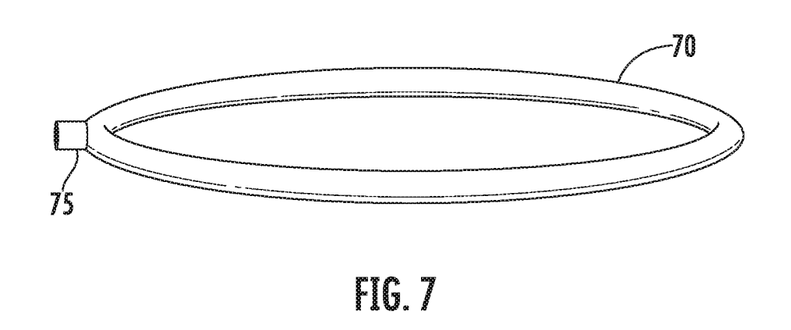
FIG. 7 illustrates a halo attachment for according to various embodiments described herein.

FIG. 7 illustrates an example positioning structure 70 comprising an expanse of material configured to separate sides of a mosquito net, e.g., as described with respect to FIGS. 6A & 6B. The shape of the positioning structure 70 provides a form to the net 64 and separates an interior expanse of the net 64 to provide space between sides of the net 64 that drape from the periphery of the positioning structure 70. In some embodiments, the positioning structure 70 may include an opening between periphery portions to allow light passage and provide a central open portion along the bottom of the net 64, which forms an upper extent of the net 64 when positioned over the positioning structure 70 The illustrated positioning structure 70 comprises an oblong ring or halo shape having an attachment structure 75 for attaching to the attachment point of the accessory attachment. In some embodiments, the positioning structure 70 may comprise other shapes such as circular, triangular, quadrilateral, or other geometric or non-geometric shape. The positioning structure 70 may or may not include a central opening. In one example, the positioning structure 70 comprises one or more rods, which may radiate outwardly from one or more points to expand the interior of the net 70 and provide.

The attachment structure 75 may comprise any suitable attachment structure. For example, the attachment structure 75 may comprise a slot to receive the attachment point or an adaptor, for example. In some embodiments, the attachment structure 75 comprises a threaded connection. In the illustrated embodiment, the attachment structure 75 is positioned along a lateral side of the positioning structure to extend approximately level with the top of the arm when attached. In other embodiments, the attachment structure 75 may be positioned to interface with the attachment point or an adaptor coupled there along such that attachment results in the positioning structure 70 extending above, below, and/or to one or more sides of the arm portion.

Although the accessory attachment device has been described as engaging a lower rail, underside, and/or lower edge of a bassinet, it will be understood that the accessory attachment device may be secured by placing the lower clamp feet and/or engagement surfaces in contact with the underside of any stable structure located below the upper structure or upper rail of the bassinet. As noted above, in some embodiments, the lower clamp may be engaged with a lower rail or lower edge of a bassinet, which may be in addition to or instead of engaging an underside of the bassinet. In one such example, the upper and lower engagement surfaces are not horizontally offset. In a further or another example, gap is absent.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification.

Various elements described herein have been described as alternatives or alternative combinations. It is to be appreciated that embodiments may include one, more, or all of any such elements. Thus, this description includes embodiments of all such elements independently and embodiments including such elements in all combinations.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" refers to "x", "y", or both "x" and "y", whereas "either x or y" refers to exclusivity.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

What is claimed is:

1. A bassinet accessory attachment device, the device comprising:
   a clamp assembly, the clamp assembly including an upper clamp, a lower clamp, a connector connecting the upper clamp and the lower clamp, and a bias member, wherein the bias member is configured to bias the upper clamp and lower clamp toward one another to compress the upper and lower clamps against respective upper and lower structures of a bassinet to attach the accessory attachment device to the bassinet;
   wherein the upper clamp comprises:
      an upper clamp body that extends outwardly from the connector to a distal portion, and an upper clamp foot projecting downwardly from the distal portion of the upper clamp body, the upper clamp foot having an engagement surface configured to engage an upper edge or rail of the bassinet; and wherein the lower clamp comprises:
- a lower clamp body that extends outwardly from the connector to a distal portion,
- a lower clamp foot projecting upwardly from the distal portion of the lower clamp, the lower clamp foot having an engagement surface along an upper surface configured to engage and compress against an underside of the bassinet by the bias provided by the bias member, and
- a recessed gap defined between the lower clamp foot and the connector dimensioned to receive a lower edge or rail of the bassinet.

2. The device of claim 1, wherein the lower clamp foot is offset from the upper clamp foot such that the lower clamp foot is positioned more outwardly distal from the connector than the upper clamp, wherein the connector connects the upper clamp and the lower clamp.

3. The device of claim 1, further comprising a secondary attachment configured to provide a secondary attachment to the bassinet, wherein the secondary attachment comprises a strap configured to attach to a bassinet, and wherein the strap extends from the lower clamp.

4. The device of claim 1, wherein the engagement surface of the upper clamp foot comprises an arcuate contour for engaging the upper rail of the bassinet, and wherein a radius of a distal portion of the arcuate contour is less than a radius of a proximal portion of the arcuate contour.

5. The device of claim 1, wherein the lower clamp foot comprises a first foot and a second foot, wherein the first foot is spaced apart laterally from the second foot.

6. The device of claim 1, wherein the gap includes a groove that extends laterally along the gap along an arcuate path.

7. The device of claim 1, further comprising a stanchion comprising a vertically extending portion that extends from the connector from a first end to a second end, wherein the stanchion further comprises an arm portion having a first end and a second end, wherein the first end of the arm portion extends from the second end of the vertically extending portion of the stanchion and the second end of the arm portion extends substantially horizontally from the first end of the arm portion.

8. The device of claim 7, further comprising an accessory attached or attachable to the stanchion, wherein the accessory comprises a mosquito net assembly, a camera, or a mobile.

9. The device of claim 7, wherein the second end of the arm portion includes an attachment point for attaching an accessory to the stanchion.

10. The device of claim 7, further comprising an accessory comprising a mosquito net assembly.

11. The device of claim 10, wherein the mosquito net assembly comprises a positioning structure attached or attachable to the stanchion and a mosquito net configured to be draped over the positioning structure to hang over and around the bassinet.

12. The device of claim 11, wherein the mosquito net comprises a weighted hem.

13. The device of claim 11, wherein the positioning structure extends from the arm portion of the stanchion.

14. The device of claim 13, wherein the positioning structure extends substantially horizontally relative to the vertically extending portion.

15. The device of claim 14, wherein the positioning structure comprises an oblong ring.

16. A method comprising:
attaching an accessory attachment device to a bassinet, wherein the accessory attachment device comprises a clamp assembly for attachment to the bassinet and a stanchion that extends from the clamp assembly to position an accessory above the bassinet, wherein the clamp assembly comprises a connector that connects an upper clamp and a lower clamp and biases the upper clamp and lower clamp toward each other, wherein attaching the accessory attachment device to the bassinet comprises:

positioning the upper clamp over an upper edge or rail of the bassinet, wherein the upper clamp comprises:
- an upper clamp body that extends outwardly from the connector to a distal portion, and
- an upper clamp foot projecting downwardly from the distal portion of the upper clamp body, the upper clamp foot having an engagement surface configured to engage the upper edge or rail of the bassinet;

positioning a lower edge or rail of the bassinet within a recessed gap defined between the connector and a lower clamp foot configured to receive the lower edge or rail of the bassinet, wherein the lower clamp comprises:
- a lower clamp body that extends outwardly from the connector to a distal portion, and wherein the lower clamp foot projects upwardly from the distal portion of the lower clamp and has an engagement surface configured to engage an underside of the bassinet, wherein the lower clamp foot is offset from the upper clamp foot such that the lower clamp foot is positioned more outwardly distal from the connector than the upper clamp, wherein the connector connects the upper clamp and the lower clamp; and allowing the bias provided by the connector to compress the upper clamp foot against the upper edge or rail of the bassinet and the lower clamp foot against the underside of the bassinet to entrap the bassinet between the upper and lower clamps allowing for height variances between the upper rail and underside of the bassinet and/or flexibility in the upper rail.

17. The method of claim 16, further comprising:
attaching the stanchion to the connector, and
attaching the accessory to an arm portion of the stanchion such that the accessory hangs over a sleeping area of the bassinet.

18. The method of claim 16, further comprising attaching a secondary attachment mechanism of the accessory attachment device to the bassinet, wherein the secondary attachment mechanism comprises a strap that extends from the lower clamp, and wherein the attaching the secondary attachment mechanism comprises attaching the strap to the underside of the bassinet.

19. The method of claim 16, wherein the engagement surface of the upper clamp foot comprises an arcuate contour for engaging the upper rail of the bassinet, and wherein a radius of a distal portion of the arcuate contour is less than a radius of a proximal portion of the arcuate contour.

20. The method of claim 16, wherein the gap includes a groove that extends laterally along the gap along an arcuate path.

21. The method of claim 16, wherein the lower clamp foot comprises a first foot and a second foot, wherein the first foot is spaced apart laterally from the second foot.

* * * * *